FREQUENCY DIVIDER EMPLOYING A PLURALITY OF DECADE COUNTERS AND SWITCHES FOR SELECTING DESIRED FREQUENCY DIVISION

Filed April 27, 1962 4 Sheets-Sheet 1

Inventors

Wilfried Fritzsche & Conrad Helmcke

By: George H Spencer
Attorney

Inventors
Wilfried Fritzsche & Conrad Helmcke
By: George H. Spencer
Attorney

Sept. 1, 1964 W. FRITZSCHE ETAL 3,147,442

FREQUENCY DIVIDER EMPLOYING A PLURALITY OF DECADE COUNTERS
AND SWITCHES FOR SELECTING DESIRED FREQUENCY DIVISION

Filed April 27, 1962 4 Sheets-Sheet 3

Inventors

Wilfried Fritzsche & Conrad Helmcke

By: George H. Spencer

Attorney

Inventors
Wilfried Fritzsche & Conrad Helmcke
By: George H Spencer
Attorney

United States Patent Office 3,147,442
Patented Sept. 1, 1964

3,147,442

FREQUENCY DIVIDER EMPLOYING A PLURALITY OF DECADE COUNTERS AND SWITCHES FOR SELECTING DESIRED FREQUENCY DIVISION

Wilfried Fritzsche, Berlin-Charlottenburg, and Conrad Helmcke, Berlin-Tempelhof, Germany, assignors to Licentia Patent-Verwaltungs-G.m.b.H., Frankfurt am Main, Germany Filed Apr. 27, 1962, Ser. No. 190,560
Claims priority, application Germany Apr. 28, 1961
10 Claims. (Cl. 328—41)

The present invention relates to a frequency divider arrangement for dividing a fixed input pulse repetition frequency by means of a selector switch, preferably of the decade-type.

It is known to derive divided pulse frequencies from a fixed input pulse repetition sequence by using integral dividers. The drawback of such an arrangement, however, is that the pulses appearing at the output of the frequency divider arrangement, per unit time, are not evenly distributed.

It is, therefore, an object of this invention to provide, in as simple and economic a manner as possible, a frequency divider which derives, from a fixed input pulse repetition frequency, divided pulse sequences in which the time intervals between consecutive pulses are approximately and substantially constant.

It is another object of the present invention to provide a system which, in order to provide a reliable switching, switches statically and does not differentiate.

With the above objects in view, the present invention resides basically in a frequency divider for carrying out frequency division of a fixed input pulse repetition frequency by means of adjustable selector switches, preferably of the decade-type, wherein the incoming pulses of each decade are applied, one after the other, to a system of logic circuits, i.e., AND-circuits and OR-circuits, which system applies to the output of the frequency divider substantially evenly distributed square wave pulse sequences which correspond to the adjusted switch positions.

Additional objects and advantages of the present invention will become apparent upon consideration of the following description when taken in conjunction with the accompanying drawings in which.

Figures 1, 2:
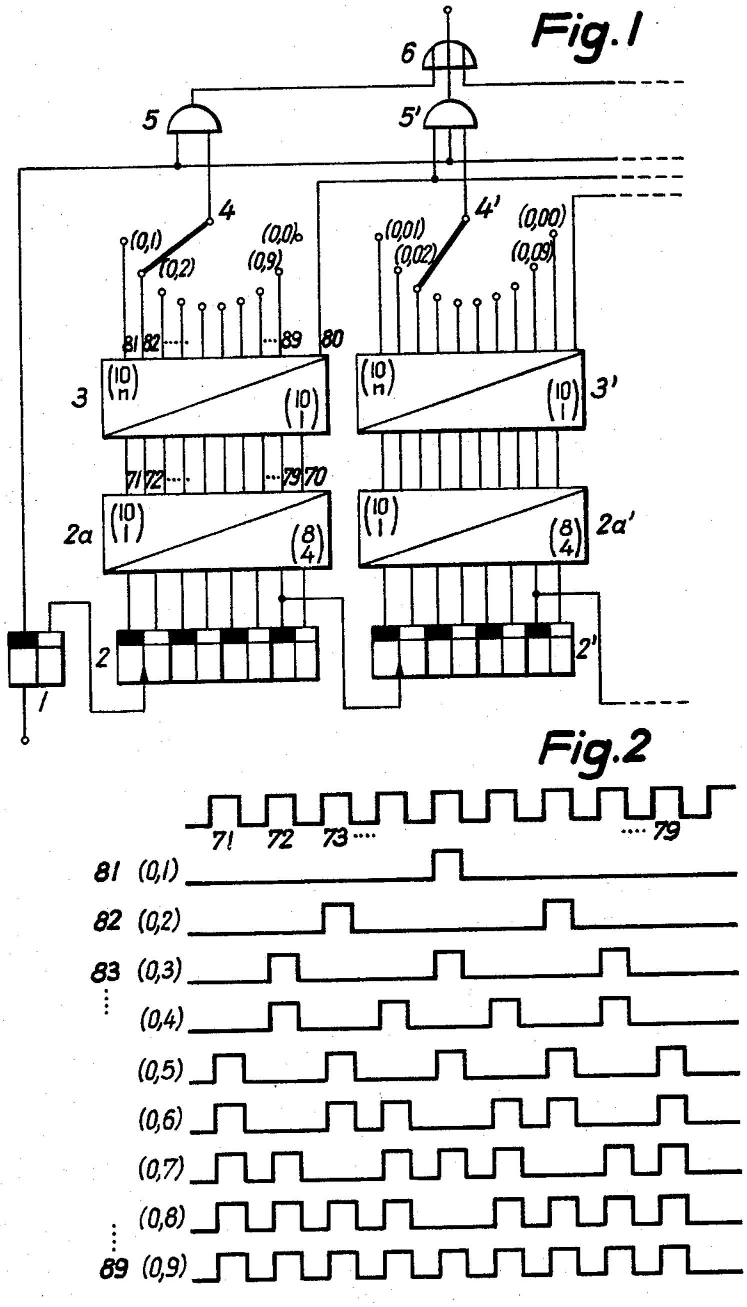
FIGURE 1 is a schematic circuit diagram of a frequency divider according to the present invention.
FIGURE 2 shows certain input and output wave patterns.

Referring now to the drawings and to FIGURE 1 thereof in particular, the same shows a two-output pulse former 1 to whose input is applied the pulse repetition frequency which is to be divided. One output is connected to the input of a first decade-type electronic counter 2, which may control further decade counters 2'.

Each decade counter is a tetrad consisting of four bistable flip-flops each with two outputs. The eight outputs of each decade counter are connected to a system of AND-gates 2*a*, 2*a'*, which system has ten outputs. The particular output at which a signal appears depends on the signal entering the decade counter. The outputs of the AND-gates are connected to a system of OR-gates 3, 3', which also have a series of outputs, preferably ten in number. Nine of these outputs are so connected to the OR-gates that a predetermined number of pulses appear thereat when the decade counter is run through once. For example, one pulse may appear at the first output lead when the decade counter is run through once, two pulses may appear at the second output lead, and so on, with nine pulses appearing at the ninth output lead. These nine output leads are connectible to a selector switch 4, 4', through which any one output lead can be connected to one input of an AND-gate 5, 5'. Another input of each of these AND-gates 5, 5', is connected with the other output of the pulse former 1.

Assuming that the selector switch 4 is in the position illustrated in FIGURE 1, wherein the switch is connected to the second output lead of the OR-gate 3 at which output lead two pulses will appear when the decade counter 2 is run through, then a correspondingly divided number of pulses will appear at the AND-gate 5. The outputs of the second decade counter 2', which is controlled by the first decade counter 2, are similarly connected. The last AND-gate 5' which is connected to this decade counter is provided with an additional input which is connected to the tenth output of the OR-gate 3.

The outputs of the AND-gates 5 and 5' are connected via an OR-gate 6 at whose output there will appear the desired output pulse sequence which sequence has the following advantage: the pulses will be distributed evenly over the counting time interval. Additional decade counters can be provided in a similar manner. By appropriately connecting the OR-gates 3, 3', etc., it is possible to produce any desired frequency division relations. Furthermore, the circuit can also be considered as a multiplying circuit for multiplying by factors smaller than 1.

The AND-gates 2*a*, 2*a'* are known-type converters described, for instance, in VDE Book Series, volume 4, page 362, FIGURE 25, left-half thereof. Of course, it is basically possible to let the decade counter be constituted by a ring-type decade counter which counts directly in 1-out-of-10 code. Thanks to the AND-circuit 5, if a sinusoidal input frequency is applied to the pulse former 1, the output of the circuit will be a square-wave form of a half wave of the input frequency, as shown in FIGURE 2.

Figure 3:
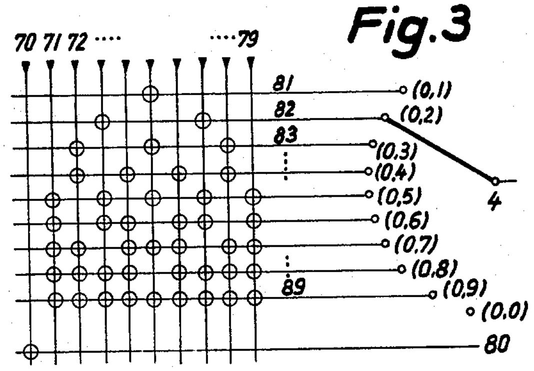
FIGURE 3 shows one embodiment of the present invention, FIGURE 2 being representative of the operation of this embodiment.
Figure 4:
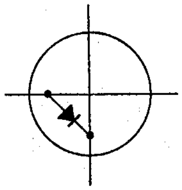
FIGURE 4 shows the connection of an OR-circuit.

FIGURES 2 and 3 show one embodiment of the present invention which produces as even a pulse distribution as possible. The top line of FIGURE 2 represents the input frequency, as it is applied, sequentially and by means of the leads, to the ten inputs 71, 72, 73, 74, 75, 76, 77, 78, 79, 70 of the OR-gate system 3, and the remaining lines show the output frequency as it appears at the outputs 81, 82, 83, 84, 85, 86, 87, 88, 89, 80 connected to the selector switch 4. This distribution is obtained by means of the special lattice-type connection of the OR-gate system 3, as shown in FIGURE 3, wherein the vertical lines represent the input leads of the OR-gate, the horizontal lines representing connections with the individual taps of the selector switch 4. (The numbers shown, in conjunction with leads 81–89, in parentheses represent the respective set mutliplication factor $\alpha$ for the input frequency, which is less than 1.) Certain ones of the intersections are connected by diodes, these connections being represented diagrammatically by circles, the actual connections being as shown in FIGURE 4. Depending on the setting of the selector switch, the output pulse sequence has certain gaps, as shown in FIGURE 2, so that for each 10 input pulses only 1, or 2, or 3, etc., pulses will appear at the output. If the multiplication factor, which is smaller than 1, is to be adjusted more finely, additional decade counters will have to be used. Such an additional decade, indicated at 2' in FIGURE 1, is controlled by the carry-over of the first decade counter 2 so that its switching sequence will be only $\frac{1}{10}$ of the input frequency. Similarly, the selector switch 4' will be exposed to the same pulse sequence as switch 4, but at $\frac{1}{10}$ the rate. In the fullest pulse sequence, namely that for factor 0.9, only the 0th or 10th digit remains free. Therefore, the output 80 in the circuit of the first decade is applied to the AND-circuit 5'. The latter thus obtains signals from the input pulse former 1, from output 80 of the first decade, and from the switch 4'. The output of the AND-circuit is applied to the output of the entire circuit via the OR-circuit 6. Thus, the switch 4' allows the factors $\alpha=0.01$ to 0.09 to be entered. The AND-circuits 5, 5', etc., will have progressively more inputs, corresponding to the additional number of digits.

Figure 5:
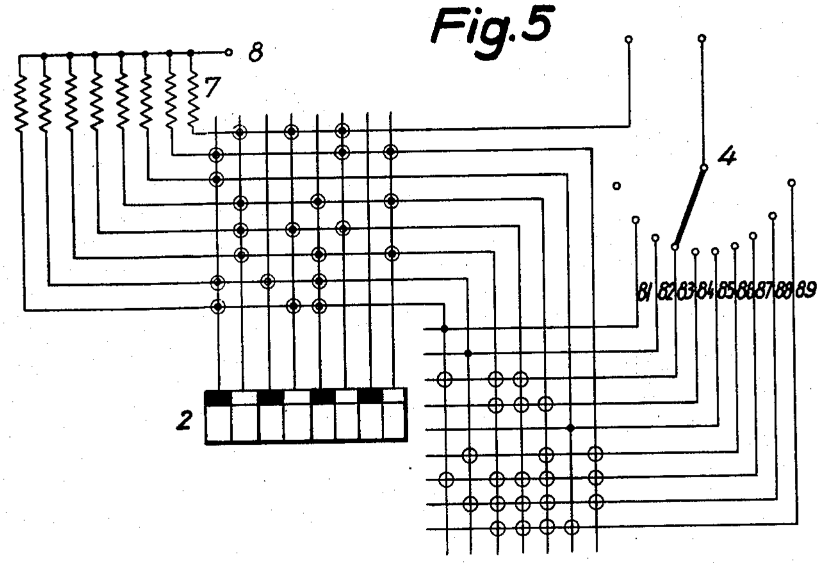
FIGURE 5 shows another embodiment of the present invention.
Figures 8, 9, 10:
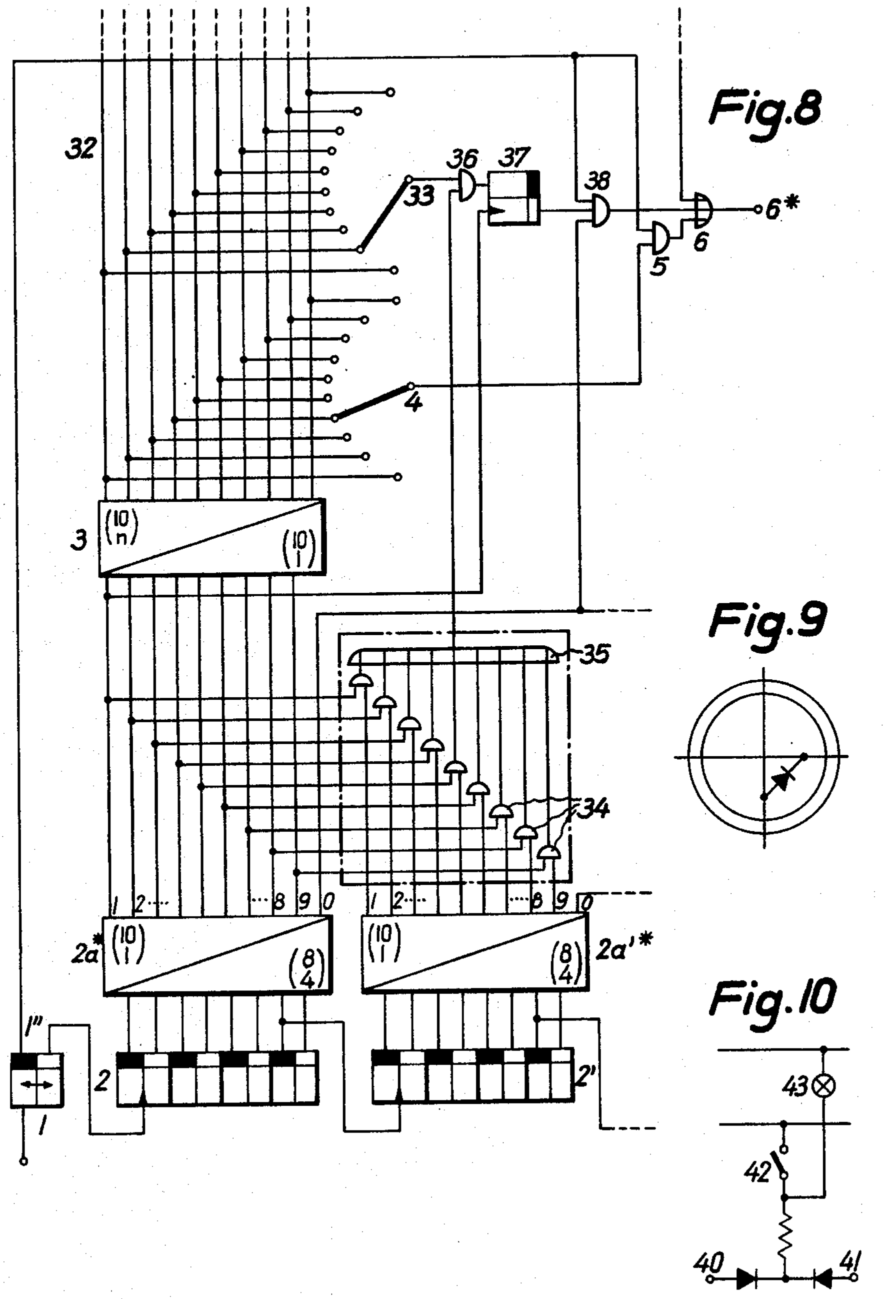
FIGURE 8 is a schematic circuit diagram of a frequency multiplier using but one multiple lead, this embodiment being intended for special applications.
FIGURE 9 shows the connection of an AND-circuit.
FIGURE 10 shows the use of an AND-circuit as the selector switch.

If one starts directly with the tetrad decade counter, it is possible, by combining the AND-system **2*a* with the OR-system 3, to form a circuit requiring few component parts, if the combination uses but two diodes or even one diode. Such a combination circuit is shown in FIGURE 5, wherein the outputs, in the form of collector connections, go from the tetrad decade counter 2 to separate AND-circuits whose diodes are represented by concentric circles located at the intersections of the leads. The actual connections are depicted in FIGURE 9. The AND-circuit is complemented by a group of resistors 7 leading to the negative terminal 8. The outputs of the AND-circuits are represented by horizontal lines leading to the OR-circuits, represented by a single circle, the actual connections being, as stated above, depicted in FIGURE 4. The vertical output lines of these OR-circuits are connected to the switch 4**.

The very marked advantage of the above arrangement is apparent from a consideration of the number of diodes which are used. The described circuit uses 45 diodes. This is the same number as the number of diodes used in the OR-system of FIGURE 3 alone, whose use requires the employement of 30 additional diodes in the AND-system **2*a***.

Figure 6:
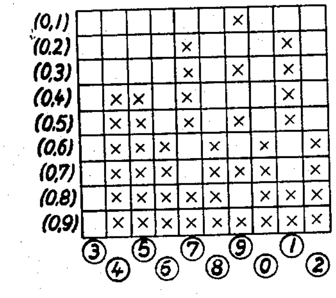
FIGURE 6 is a diagrammatic illustration of another embodiment of the present invention.

It is sometimes necessary to let a value which is already in a tetrad decade counter or in a corresponding storage device serve as the setting value for the frequency multiplier. If the operating conditions allow the use of the arrangement of FIGURE 6, whose distribution is somewhat less regular than that produced as shown in FIGURE 2, by the arrangement of FIGURE 3, it is possible to provide a circuit which is very economical. The horizontal represents the current value, represented by the circled numbers, whereas the vertical represents the values of the factors.

Figure 7:
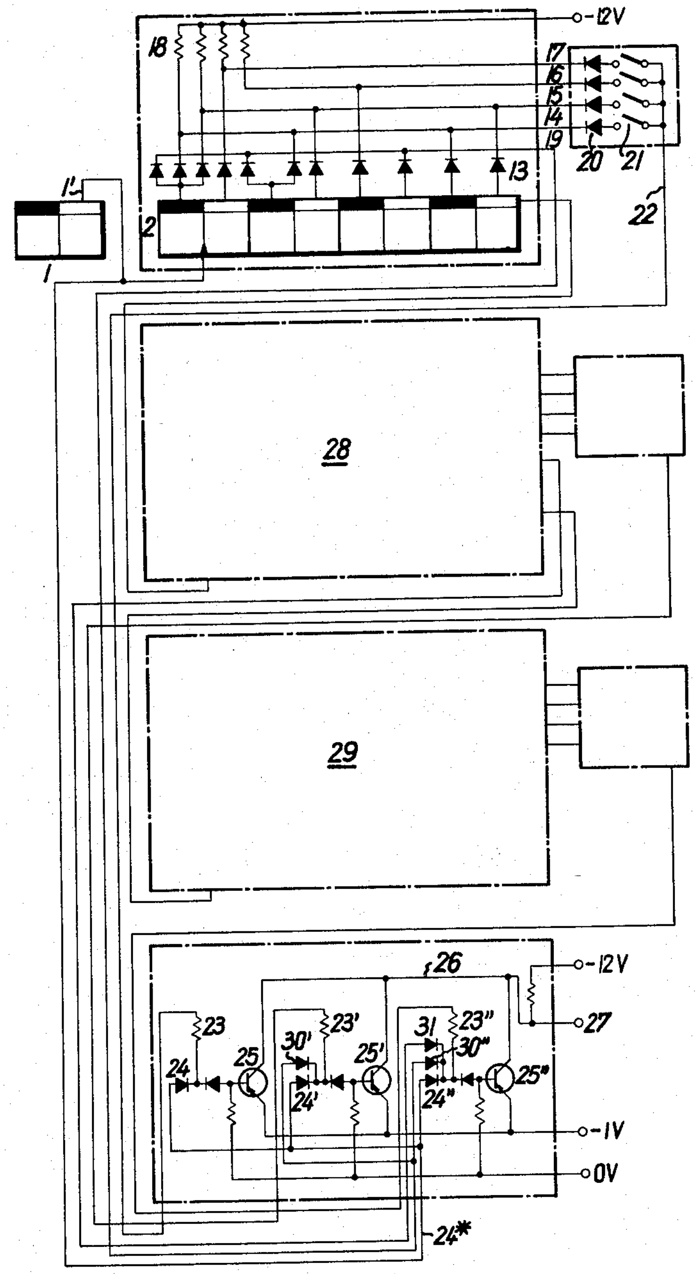
FIGURE 7 is a schematic circuit diagram of the embodiment of FIGURE 6.

The electric circuit, shown in FIGURE 7, includes the pulse former 1 having an output 1' connected to the input decade counter 2. The eight outputs of the counter flip-flops are applied, via diodes 13, to four bus bars 14, 15, 16, 17, which are connected, by resistors 18, to the negative terminal. The 0-output 19 is also connected by means of diodes. The outputs 14, 15, 16, 17, can be utilized by way of diodes 20. If this arrangement is to be switched by means of switches, the same must be connected as shown at 21. The pulses go from the output terminal 22, via a resistance 23, which together with the diode 24 forms an AND-circuit in the clock line 24*, to an amplifier transistor 25. In this case it is not the antivalent output of the pulse former 1 which is used, because the AND-circuit per se is antivalent. The output pulses go from the amplifier transistor 25, via the bus bar 26, directly to the output terminal 27. The other decade counters are similarly connected, as shown by the boxes 28 and 29. The difference is that, in place of the resistor 23 and the diode 24, the AND-circuits are formed, in addition to the components 23', 24'; 23'', 24'', by diodes 30' and 30'' and 31. The signals then go from the transistors 25' and 25'' to the output terminal 27 via the bus bar 26.

The above-described simple circuit can be used for each usable code, if the diodes are appropriately connected.

The frequency multiplier according to the arrangement of FIGURE 1 can be used to particular advantage if a frequency is to be multiplied by different factors simultaneously. This is done, for example, to obtain the individual components of a mixed frequency signal which individual components are to constitute the intended frequency sequences, or in order to control a multiple motor drive. To accomplish this, a basic system, consisting of the decade counters 2 and 2', the OR-circuits 3 and 3', and the input pulse former 1, is required.

It will be found advantageous to connect simple amplifiers, such as transistors, to the outputs of the OR-circuits 3 and 3'. The switches 4 and 4' will then have to be provided for each output separately; the same holds true for the AND-circuits 5 and 5' and the OR-circuit 6. If the system as a whole is a relatively elaborate one, it can be relatively expensive to provide multiple leads for each digit. This drawback may be overcome by the arrangement shown in FIGURE 8. Here the output of the input pulse former 1 is connected to tetrad decade counters 2 and 2'. The 1-out-of-10 logic circuit is shown separately and represented at **2*a**** and 2*a'**. The first digit is switched normally via the OR-circuit 3. Only one switch 4 is shown. The signal goes from the switch, via the AND-circuit 5, to the OR-circuit 6 and thence to the output 6*. The multiple lead 32 is connected to further selector switches (not shown). The next digit for the output 6* is taken from a switch 33 which is connected to the same multiple lead 32. However, in order to actuate the second decade counter 2', special AND-circuits 34 are provided which determine whether there is coincidence with any of the outputs of the circuit 2*a**. If there is such coincidence, a signal is applied, via OR-circuit 35, to one input of an AND-circuit 36. The other input of the AND-circuit 36 is connected to the output of the switch 33. The output of the AND-circuit 36 is applied to a flip-flop 37 and actuates the same if a pulse has arrived, via the multiple lead 32 and the switch 33, from the corresponding decade counter. When this flip-flop 37 is actuated via the AND-circuit 36, the AND-circuit 38 is excited. The second input of the AND-circuit 38 is controlled by the 0 terminal of the circuit 2*a**, and the third input of the AND-circuit 38 is controlled by the output 1'' of the pulse former 1 so that this AND-circuit will then apply, via the OR-circuit 6, to the output 6* the requisite pulse corresponding to the next decade. In a corresponding manner, a switch similar to 33 is used for any higher decades. In such an arrangement, the AND-circuit which corresponds to the AND-circuit 38 will then have one or more additional inputs so as to take up, into the AND-condition, the point 0 of the circuit 2*a'****.

The switches described so far are all so arranged that the tap will have a potential other than 0. If, however, as is the case in certain larger punched card reading systems, a common potential is available solely for the switches, special AND-circuits have to be provided for each switching position. But this produces the particular advantage that it is then possible to switch, simultaneously, devices requiring more power, such as number indicating lamps. This is shown in FIGURE 10, in which the point 40 is connected to the OR-circuit 3, via the multiple lead 32, with point 41 being connected to the AND-circuit 5, or 36, etc. The switch 42 can then be actuated statically by the punched card. The lamp 43 may, if desired, be part of a projecting system which indicates the particular number.

It will be understood that the above description of the present invention is susceptible to various modifications, changes, and adaptations, and the same are intended to be comprehended within the meaning and range of equivalents of the appended claims.

What is claimed is:

1. A frequency divider for carrying out frequency division of a fixed input pulse repetition frequency, said divider having an output and comprising, in combination:

(a) a pulse former having an input to which the pulse repetition frequency is applied, and an output;

(b) a plurality of successive decade-type counters, each of said counters having multiple outputs, the multiple outputs of each counter, except the last, including a carry-output as well as a zero-output at which a signal appears when the count of the respective counter is zero, the first of said counters having an input connected to the output of said pulse former and each succeeding counter having an input connected to the carry-output of the preceding counter;

(c) a plurality of multiple AND-gate means, the inputs of each AND-gate means being connected to the outputs of a corresponding one of said counters;

(d) a plurality of multiple OR-gate means, the input of each OR-gate means being connected to the outputs of a corresponding one of said AND-gate means;

(e) a plurality of selector switches, each having a multiplicity of inputs and an output which is selectively connectible to said multiplicity of inputs, said multiplicity of inputs being connected to the outputs of a corresponding one of said OR-gate means;

(f) a plurality of AND-circuits each having one input connected to the output of said pulse former and another input connected to the output of a corresponding one of said selector switches, all but the first of said AND-circuits having additional input means connected to the zero-outputs of counters corresponding to preceding selector switches;

(g) an OR-circuit having a plurality of inputs connected to the respective outputs of said AND-circuits, the output of said OR-circuit constituting said output of the frequency divider; and (h) said AND-gate means and said OR-gate means being arranged to produce, at said output of the frequency divider, substantially evenly distributed square wave pulses which correspond to the adjusted positions of said selector switches.

2. A frequency divider as defined in claim 1 wherein each of said selector switches includes means for connecting the selector switch output to any selected one of the multiplicity of selector switch inputs.

3. A frequency divider as defined in claim 1 wherein each of said selector switches includes means for connecting the selector switch output to more than one of said multiplicity of selector switch inputs, each selector switch thus constituting a coded device, and AND-gate means and said OR-gate means being arranged to match the code.

4. A frequency divider as defined in claim 1 wherein OR-gate means comprise a lattice-type network constituted by a first and second series of conductors, the conductors of each series being parallel to each other and the two series of parallel conductors intersecting each other, said first series of conductors being connected to the output of the AND-gate means and said second series of conductors being connected to the multiplicity of inputs of a respective selector switch, said network further including diodes located at selected ones of the points of intersection of said two series of conductors and interconnecting respective ones of the conductors located at such points of intersection.

5. A frequency divider as defined in claim 1 wherein corresponding ones of the multiplicity of inputs of all of said selector switches are connected to each other; said frequency divider further comprising a second AND-circuit connected to the output of the second of said selector switches; a bistable circuit having one input connected to the output of said second AND-circuit, the other input of said bistable circuit being connected to that output of the AND-gate means pertaining to the first selector switch at which the first counting pulse appears; a plurality of third AND-circuits each having its inputs connected to corresponding outputs of said AND-gate means pertaining to the first and second selector switches; a second OR-circuit having a plurality of inputs connected, respectively, to the outputs of said third AND-circuits, the output of said second OR-circuit being connected to another input of said second AND-circuit; and a fourth AND-circuit having an input connected to the output of said pulse former, another input connected to the output of said bistable circuit, and still another input connected to said zero-output of the AND-gate means pertaining to said first selector, the output of said fourth AND-circuit being connected to an input of the first-mentioned OR-circuit.

6. A frequency divider as defined in claim 1 wherein said selector switches are constituted by electronic switching means.

7. A frequency divider as defined in claim 4, wherein said OR-gate means includes consecutive inputs 1 through 10 and outputs 1′ through 10′, connected respectively to said first and second series of conductors, said diodes connecting:

(a) input 1 with output 1′,
(b) input 6 with output 2′,
(c) inputs 4 and 8 with output 3′,
(d) inputs 3, 6 and 9 with output 4′,
(e) inputs 3, 5, 7 and 9 with output 5′,
(f) inputs 2, 4, 6, 8 and 10 with output 6′,
(g) inputs 2, 4, 5, 7, 8 and 10 with output 7′,
(h) inputs 2, 3, 5, 6, 7, 9 and 10 with output 8′,
(i) inputs 2, 3, 4, 5, 7, 8, 9, and 10 with output 9′, and
(j) inputs 2, 3, 4, 5, 6, 7, 8, 9 and 10 with output 10′.

8. A frequency divider as defined in claim 4, wherein said OR-gate means includes consecutive inputs 1 through 10, and outputs 1′ through 9′, connected respectively to said first and second series of conductors, said diodes connecting:

(a) input 10 with output 1′,
(b) inputs 2 and 8 with output 2′,
(c) inputs 2, 8 and 10 with output 3′,
(d) inputs 2, 5, 6 and 8 with output 4′,
(e) inputs 2, 5, 6, 8 and 10 with output 5′,
(f) inputs 1, 3, 5, 6, 7 and 9 with output 6′,
(g) inputs 1, 3, 5, 6, 7, 9 and 10 with output 7′,
(h) inputs 1, 2, 3, 5, 6, 7, 8 and 9 with output 8′, and
(i) inputs 1, 2, 3, 5, 6, 7, 8, 9 and 10 with output 9′.

9. A frequency divider as defined in claim 1, wherein said AND-gate and OR-gate means comprise a lattice-type network including first, second and third series of conductors, the conductors of each series being parallel to each other, said third series including conductors 1 through 8, said first and third series intersecting each other and said second and third series intersecting each other, the conductors of said first series being connected respectively to the outputs of a respective counter, said outputs including 1, $\overline{\mathbf{1}}$, 2, $\overline{\mathbf{2}}$, 4, $\overline{\mathbf{4}}$, 8 and $\overline{\mathbf{8}}$ terminals, said lattice-type network further including diodes connected between said first and third series of conductors, connecting:

(a) output terminal 1 to conductors 1, 2, 6 and 7,
(b) output terminal $\overline{\mathbf{1}}$ to conductors 3, 4, 5 and 8,
(c) output terminal 2 to conductor 2,
(d) output terminal $\overline{\mathbf{2}}$ to conductors 1, 4 and 8,
(e) output terminal 4 to conductors 1, 2, 3 and 5,
(f) output terminal $\overline{\mathbf{4}}$ to conductors 4, 7 and 8, and
(g) output terminal $\overline{\mathbf{8}}$ to conductors 3, 5 and 7, and the conductors of said second series are connected to the multiplicity of inputs 1′ through 9′ of a respective selector switch, said lattice-type network further including diodes connected between said second and third series of conductors, connecting:

(*h*) conductor 1 to inputs 3′ and 7′,
(*i*) conductor 2 to inputs 6′ and 8′,
(*j*) conductor 3 to inputs 3′, 4′, 7′, 8′, and 9′,
(*k*) conductor 4 to inputs 3′, 4′, 7′, 8′ and 9′,
(*l*) conductor 5 to inputs 4′, 6′, 7′, 8′, and 9′,
(*m*) conductor 6 to input 9′,
(*n*) conductor 7 to inputs 6′, 7′ and 8′, conductors 1, 2 and 6 also being directly connected, respectively, to inputs 1′, 2′ and 5′.

10. A frequency divider as defined in claim 3, wherein said OR-gate means comprise first, second, third and fourth diodes, each having an input terminal and each having an output terminal connected to one of said multiplicity of selector switch inputs, said counter means having 1, $\bar{1}$, 2, $\bar{2}$, 4, $\bar{4}$, 8 and $\bar{8}$ outputs, a plurality of other diodes, (*a*) the 1, 2 and 8 outputs being connected through respective ones of said other diodes to said first diode input,
(*b*) the 1, $\bar{2}$ and $\bar{8}$ inputs being connected through additional respective ones of said other diodes to the second diode input,
(*c*) the 4 output being connected through one of said other diodes to the third diode input, and
(*d*) the $\bar{1}$ output being connected through one of said other diodes to the fourth diode input, and four resistors, said diode inputs being further connected through said resistors to a common point.

References Cited in the file of this patent

UNITED STATES PATENTS 2,563,841 Jensen ---------------- Aug. 14, 1951